(12) United States Patent
Xiao et al.

(10) Patent No.: US 11,917,490 B1
(45) Date of Patent: *Feb. 27, 2024

(54) UNCERTAINTY BASED LOCATION REPORTING IN E911 SYSTEMS

(71) Applicant: T-Mobile Innovations LLC, Overland Park, KS (US)

(72) Inventors: Nan Xiao, Mercer Island, WA (US); Wei-Ming Lan, Morrisville, NC (US)

(73) Assignee: T-Mobile Innovations LLC, Overland Park, KS (US)

(*) Notice: Subject to any disclaimer, the term of this patent is extended or adjusted under 35 U.S.C. 154(b) by 252 days.

This patent is subject to a terminal disclaimer.

(21) Appl. No.: 17/475,878

(22) Filed: Sep. 15, 2021

(51) Int. Cl.
*H04W 4/029* (2018.01)
*H04W 4/90* (2018.01)

(52) U.S. Cl.
CPC .............. *H04W 4/029* (2018.02); *H04W 4/90* (2018.02)

(58) Field of Classification Search
CPC ................................ H04W 4/029; H04W 4/90

USPC ....................................................... 455/404.2
See application file for complete search history.

(56) References Cited

U.S. PATENT DOCUMENTS

| 11,109,214 | B1* | 8/2021 | Claybrook | .............. H04L 63/08 |
| 2011/0151889 | A1* | 6/2011 | Lundgren | ............... H04L 43/10 455/456.1 |
| 2020/0274962 | A1* | 8/2020 | Martin | .................... H04W 4/90 |

* cited by examiner

*Primary Examiner* — Ted M Wang
(74) *Attorney, Agent, or Firm* — Shook, Hardy & Bacon L.L.P.

(57) ABSTRACT

Systems, methods, and computer-readable media herein generate an E911 location report based on an uncertainty associated with a device-based hybrid (DBH) location received from a UE device. The uncertainty may be compared to an uncertainty threshold value to determine which values to include in a location report sent to a PSAP. A civic address associated with a UE device may be included in a location report where the uncertainty is sufficiently low, thus a location report can be sent to a PSAP with the most relevant and accurate information so that first responders can more effectively locate a distressed caller.

19 Claims, 8 Drawing Sheets

UNCERTAINTY BASED LOCATION REPORTING IN E911 SYSTEMS

BACKGROUND

Enhanced 911 (E911) is a vital part of the emergency response system. Upon a distressed caller placing an emergency call via user equipment (UE), E911 is able to critically provide the estimated physical location of the caller. This physical location is often provided to a Public Safety Answering Point (PSAP), such as an operator who receives 911 calls and dispatches first responders to the scene. E911 is in contrast to traditional 911 services where a caller has to orally provide the operator with location information. In E911, various types of positioning technologies can be used to derive geographical location information for a UE, which can then be provided to a PSAP. For example, location information for a UE can be provided in the form of a Device Based Hybrid ("DBH") location and/or a civic address. DBH is a positioning solution that uses a combination of technologies, such as satellite Global Positioning System (GPS) and crowd-sourced Wi-Fi measurements to produce high-accuracy location information. This technology is particularly suited for UEs located indoors.

An uncertainty value may be associated with location information generated using DBH positional technologies. A uncertainty value represents an estimate of the amount of potential positional error associated with an estimated location. In particular, the location information generated using DBH technologies may include an uncertainty value associated with a horizontal component (e.g., a horizontal uncertainty) of a location. Horizontal uncertainty is a location parameter that may indicate the outer boundary of the possible radius of a search area surrounding the estimated location coordinates for a UE, such as the estimated coordinates obtained from a DBH location. Horizontal uncertainty is a distance or region that is expressed in meters and is often expressed as a circle or an ellipse. The lower the horizontal uncertainty, the smaller the potential search area and the higher the likelihood that a caller will be located. In conventional E911 methods and systems, if transmission of a UE's DBH location to a cellular network is successful, the DBH location is used in generating a location report for the UE that is sent to a PSAP. In some scenarios, a civic address associated with a UE may be transmitted as part of the location report. The inclusion of a civic address in a location report with the DBH location may provide an enhanced ability to locate a distressed caller associated with the UE, as the search area maybe further reduced based on the additional information provided by the civic address. However, an excessively high uncertainty value for a DBH location can have significant detrimental consequences because it may increase the potential area in which a caller may be located, thereby making it more difficult for first responders to quickly find a distressed caller. In such a scenario, where the DBH uncertainty value is high, providing a civic address indicating a specific location may further disrupt or mislead first responders in their efforts to find the distressed caller, as the civic address may have limited relevance to the potential location of the caller.

SUMMARY

The present disclosure is directed, in part, to uncertainty based location reporting in E911 systems, substantially as shown in and/or described in connection with at least one of the figures, and as set forth more completely in the claims.

In contrast to conventional approaches, upon transmission of a UE's DBH location and civic address to a cellular network, an uncertainty value associated with the DBH location is taken into account when generating a location report. Depending on the uncertainty value and an associated threshold value, alternative location information (e.g., contents of a location report) may be transmitted to a PSAP. For example, in certain embodiments, location information such as a Cell Identity (CID), civic address, and/or an Enhanced Cell Identity (E-CID) associated with the UE can be transmitted based on the uncertainty value associated with the DBH location. In this way, the potential area in which a caller may be located is reduced, making it more likely that first responders will be able to quickly locate the distressed caller.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, which are intended to be exemplary and non-limiting, wherein.

DETAILED DESCRIPTION

The subject matter of embodiments of the invention is described with specificity herein to meet statutory requirements. However, the description itself is not intended to limit the scope of this patent. The claimed subject matter might be embodied in other ways to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention.

Further, various technical terms are used throughout this description. A definition of such terms can be found in, for example, Newton's Telecom Dictionary by H. Newton, 31st Edition (2018). These definitions are intended to provide a clearer understanding of the ideas disclosed herein but are not intended to limit the scope of the present invention. The definitions and terms should be interpreted broadly and liberally to the extent allowed by the meaning of the words offered in the above-cited reference.

Embodiments of the technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media includes volatile and/or non-volatile media, removable and non-removable media, and contemplate media readable by a database, a switch, and various other network devices. Network switches, routers, and related components are conventional in nature, as are means of communicating with the same. By way of example and not limitation, computer-readable media comprise computer storage media and/or communications media. Computer storage media, or machine-readable media, include media implemented in any method or technology for storing information. Examples of stored information include computer-useable instructions, data structures, program modules, and other data representations. Computer storage media include RAM, ROM, EEPROM, flash memory or other memory technology, CD-ROM, digital versatile discs (DVDs), holographic media or other optical disc storage, magnetic cassettes, magnetic tape, magnetic disc storage, and/or other magnetic storage devices. These memory components can store data momentarily, temporarily, or permanently. Computer storage media does not encompass a transitory signal, in embodiments of the present invention.

Communications media typically store computer-useable instructions, including data structures and program modules, in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

At a high level, systems, methods, and computer-readable media of the present invention generate a location report in response to a call initiated by a UE based on an uncertainty associated with a DBH location. The systems, methods, and computer-readable media disclosed herein may provide a more accurate, concise, and specific location reports to be generated for use by first responders to an emergency call. By basing the location report contents on the accuracy and/or uncertainty of location values from a UE device, only location information that is relevant within a particular threshold range may be included in the location report. For example, a UE device may provide a DBH location with an uncertainty value indicating 15 meters. In such an example, where the uncertainty is sufficiently low, the location report may be generated such that a civic address (e.g., street address, building address, etc.) is included, since the civic address may be useful to emergency responders searching an area of the size indicated by the uncertainty value. As another example, a location report may be generated that does not include a civic address if the uncertainty value is sufficiently high, (e.g., 1 km) since that information is of less importance in such a scenario, and may be misleading and/or distracting to responders if it were to be included in the location report.

In certain aspects, E911 methods, computer-readable media, and systems are provided that take into account the uncertainty value associated with a UE's DBH location. In a first aspect of the present invention, a method is provided. In embodiments, the method comprises a location received in response to a call initiated by a UE. The location may include a DBH location associated with the UE. A threshold value for a uncertainty for the DBH location may be determined. For example, the threshold value may be approximately 20 meters or chosen to be any other value. Upon determining the threshold value, it may be determined whether the uncertainty associated with the DBH location is less than or otherwise satisfies the threshold. In some embodiments, based on determining that the uncertainty associated with the DBH location is less than the threshold value, a location report may be generated that includes location information. For example, location information may be expressed in the form of geographical coordinates associated with the CID for the UE's serving base station, information associated with an E-CID for the UE, and/or a civic address associated with the UE. A location report that includes location information for the UE using a CID, E-CID, and/or civic address may then be sent to a PSAP. In this way, only relevant and therefore, more accurate location information can be provided to a PSAP, enabling first responders to locate a distressed caller faster.

In other embodiments, one or more computer-readable media having computer-executable instructions embodied thereon that, when executed, perform a method for sending an Enhanced 911 (E911) location report. The method may comprise receiving a location in response to a call initiated by a UE, wherein the location includes an uncertainty associated with the location; determining a threshold value for the uncertainty associated with the location; determining if the uncertainty associated with the location is less than the threshold value; and generating, based on determining that the uncertainty associated with the location is less than the threshold value, a location report that includes location information for the UE comprising a civic address associated with the UE.

In still other embodiments, a system for generating an enhanced 911 (E911) location report comprising one or more processors configured to execute operations comprising receiving a location in response to a call initiated by a UE, wherein the location includes a device-based hybrid (DBH) location associated with the UE; determining a threshold value for an uncertainty associated with the DBH location; determining if the uncertainty associated with the DBH location is greater than the threshold value; and generating, based on determining that the uncertainty associated with the DBH location is greater than the threshold value, a location report that omits a civic address associated with the UE.

Figure 1:
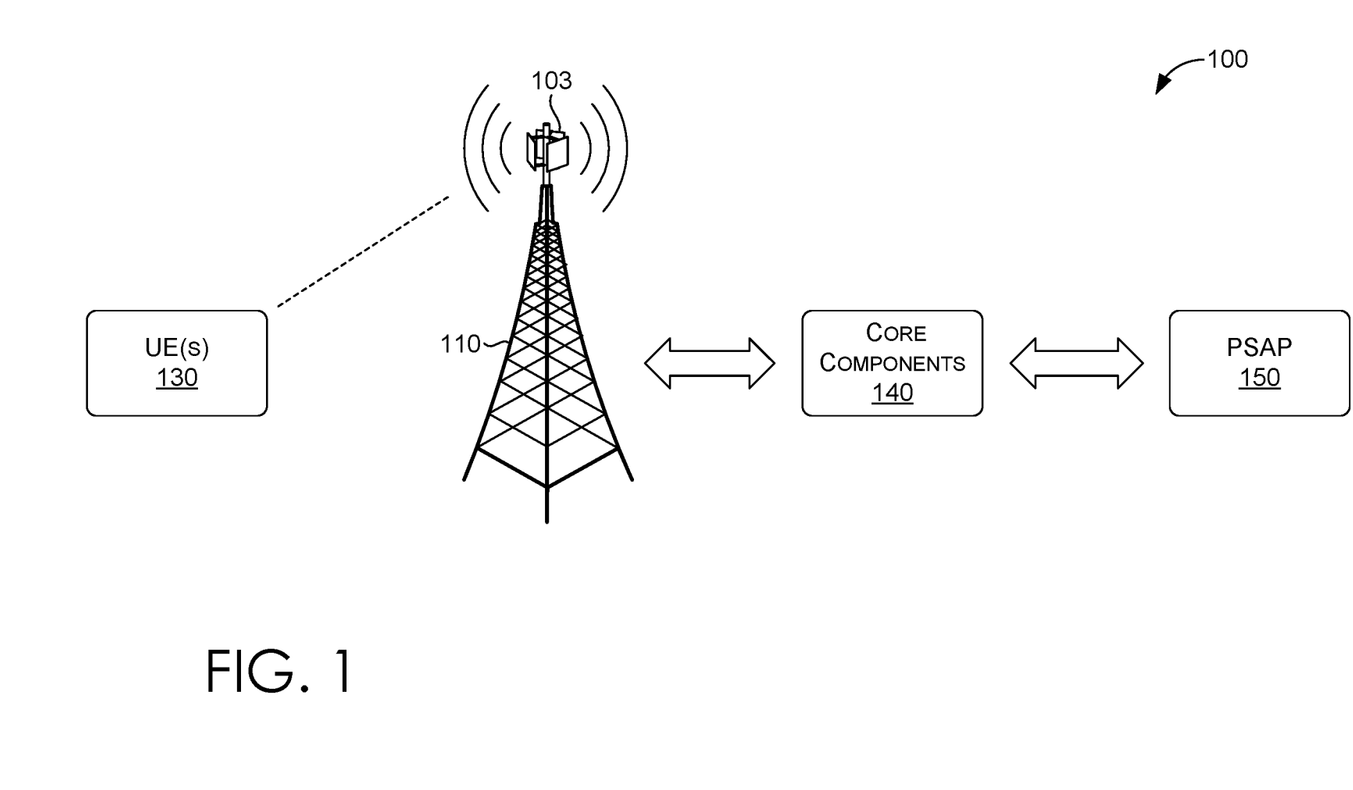
FIG. 1 depicts a diagram of an exemplary network environment in which implementations of the present disclosure may be employed.

Turning now to FIG. 1, network environment 100 is an exemplary network environment in which implementations of the present disclosure may be employed. Network environment 100 is one example of a suitable network environment and is not intended to suggest any limitation as to the scope of use or functionality of the present disclosure. Neither should the network environment be interpreted as having any dependency or requirement relating to any one or combination of components illustrated.

The network environment 100 provides service to one or more UE(s) 130, such as E911 services. In some embodiments, the network environment 100 may be a telecommunication network (e.g., a telecommunication network such as, but not limited to, a wireless telecommunication network), or portion thereof. The network environment 100 may include one or more devices and components, such as base stations, servers, switches, relays, amplifiers, databases, nodes, etc. which are not shown so as to not confuse other aspects of the present disclosure. Those devices and components may provide connectivity in a variety of implementations. In addition, the network environment 100 may be utilized in a variety of manners, such as a single network, multiple networks, or as a network of networks, but, ultimately, is shown as simplified as possible to avoid the risk of confusing other aspects of the present disclosure.

The network environment 100 may include or otherwise may be accessible through a cell site 110. The cell site 110 may include one or more antennas 103, base transmitter stations, radios, transmitter/receivers, digital signal processors, control electronics, GPS equipment, power cabinets or power supply, base stations, charging stations, etc. such that the cell site 110 may provide a communication link between the one or more UE(s) 130 and other components, systems, equipment, and/or devices of the network environment 100. The base station and/or a computing device (e.g., whether local or remote) associated with the base station may manage or otherwise control the operations of components of the cell site 110. Network environment 100 may also include core components 140 one or more of which interface with cell site 110 and/or PSAP 150.

In some embodiments, one or more UE(s) 130 may take the form of one or more wireless or mobile devices capable of communication via the network environment 100. For example, one or more UE(s) 130 may take the form of one or more mobile devices capable of communication via a telecommunication network such as, but not limited to, a wireless telecommunication network. In this regard, UE(s) 130 may be any mobile computing device that communicates by way of a network, for example, a 3G, CDMA, 4G, LTE, WiMAX, 5G, 6G or any other type of network.

As used herein, user equipment (UE) (also referenced herein as a user device or UE device) can include any device employed by an end-user to communicate with a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to device 800 described herein with respect to FIG. 8.

The network environment 100 in certain embodiments may be structured to connect subscribers to a service provider or a plurality of service providers. Alternatively or additionally, the network environment 100 may be associated with a specific telecommunication provider that provides services (e.g. 5G, voice, location, etc.) to one or more UE(s) 130. For example, the user devices 130 may be subscribers to a telecommunication service provider, in which the user devices are registered or subscribed to receive voice and data services over the network environment 100. The network environment 100 may include any communication network providing voice and/or data service(s), such as, for example, a 1×circuit voice, a 3G network (e.g., CDMA, CDMA 2000, WCDMA, GSM, UMTS, a 4G network (LTE, WiMAX, HSDPA), 5G, or a 6G network.

Having described network environments 100 and components operating therein, it will be understood by those of ordinary skill in the art that the network environment 100 is but an example of a suitable network and is not intended to limit the scope of use or functionality of aspects described herein. Similarly, network environment 100 should not be interpreted as imputing any dependency and/or any requirements with regard to each component and combination(s) of components illustrated in FIG. 1. It will be appreciated by those of ordinary skill in the art that the number, interactions, and physical location of components illustrated in FIG. 1 is an example, as other methods, hardware, software, components, and devices for establishing one or more communication links between the various components may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components may be represented as singular components or may be represented in a particular quantity in FIG. 1 it will be appreciated that some aspects may include a plurality of devices and/or components such that FIG. 1 should not be considered as limiting the quantity of any device and/or component.

Figure 2:
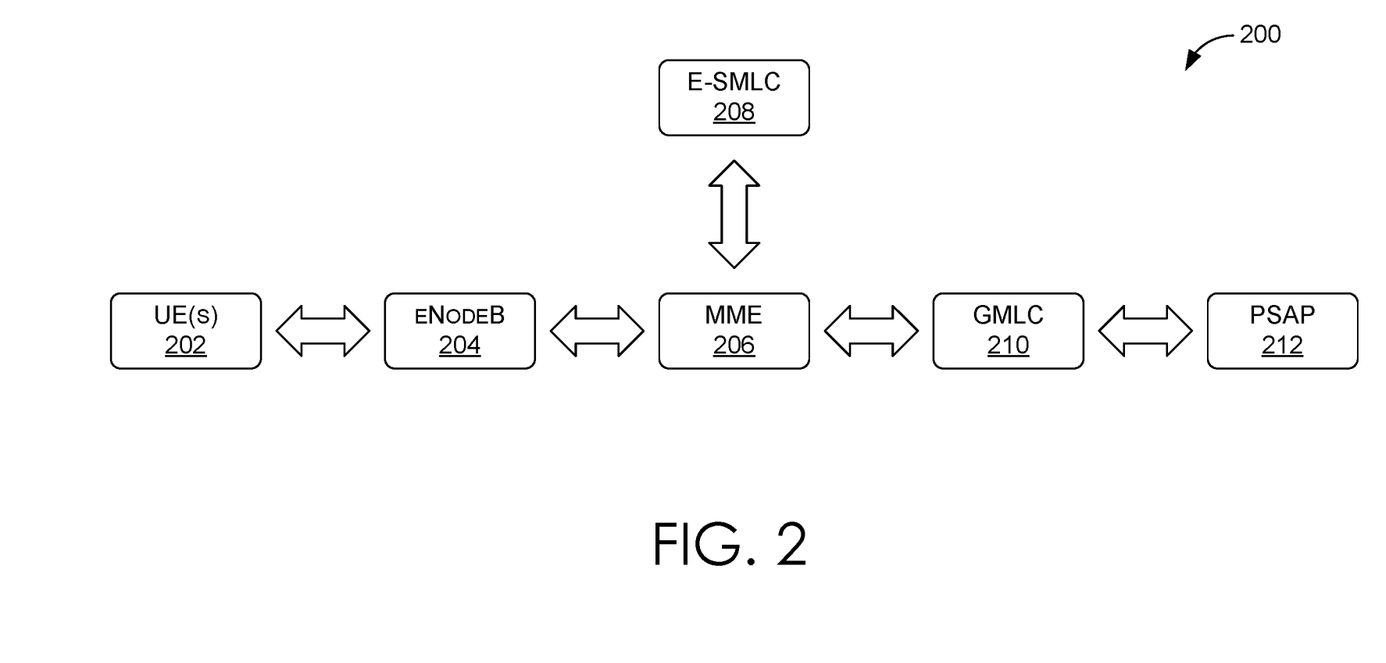
FIG. 2 depicts an example of a 4G network environment in accordance with embodiments of the present disclosure.

FIG. 2 depicts a more detailed example of network environment 100 in accordance with embodiments of the present disclosure. More particularly, FIG. 2 illustrates a 4G network environment 200 in accordance with embodiments of the present disclosure. Network environment 200 may include various 4G core components of a cellular network one or more of which may interface with PSAP 212. Network environment 200 may include one or more UE(s) 202; 4G cell site components, such as eNodeB 204; and 4G core components, such as Mobile Management Entity (MME) 206, Enhanced Serving Mobile Location Center (E-SMLC) 208, and Gateway Mobile Location Center (GMLC) 210.

Figure 3:
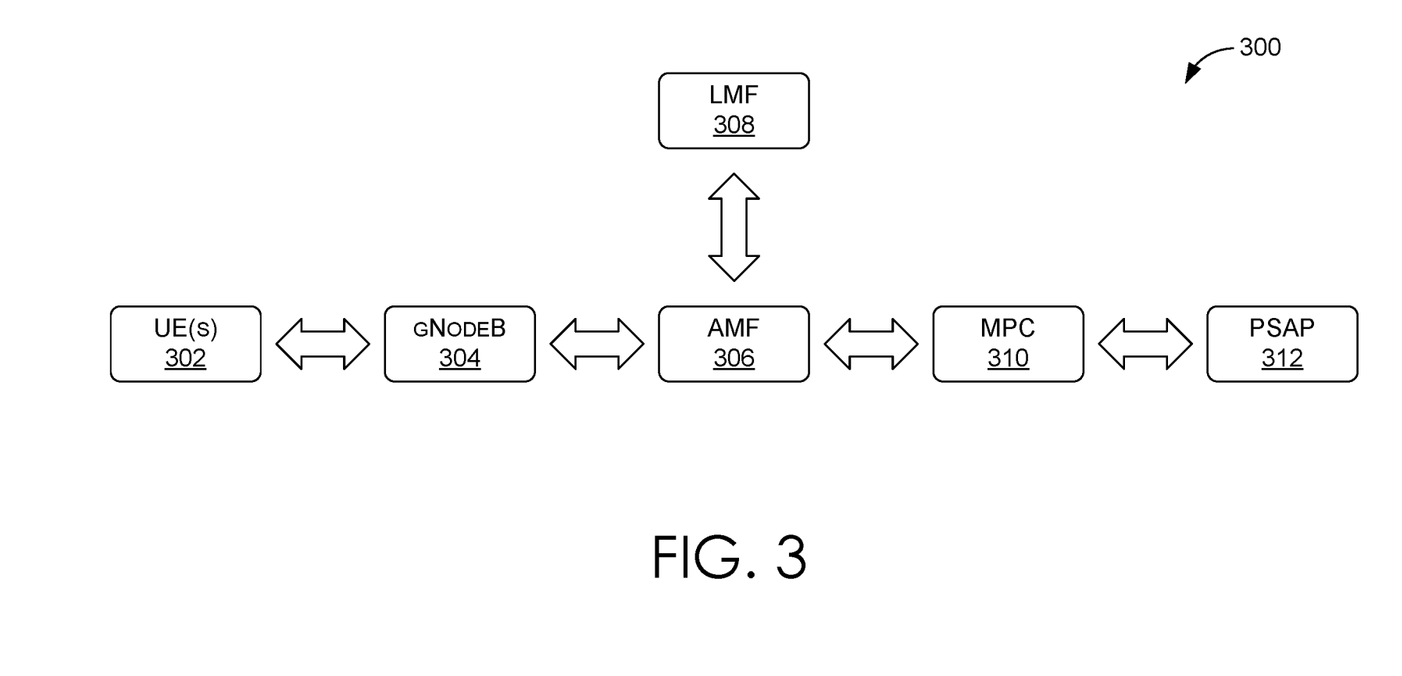
FIG. 3 depicts an example of a 5G network environment in accordance with embodiments of the present disclosure, in accordance with aspects herein.

FIG. 3 illustrates a more detailed example of network environment 100 in accordance with embodiments of the present disclosure. More particular, FIG. 3 illustrates a 5G network environment 300 in accordance with embodiments of the present disclosures. Network environment 300 may include various 5G core components of a cellular network one or more of which may interface with PSAP 312. Network environment 300 may include one or more UE(s) 302; 5G cell site components, such as gNodeB 304; and 5G core components, such as Access & Mobility Management Function (AMF) 306, Location Management Function (LMF) 308, and Mobile Positioning Center (MPC) 310.

Figure 4:
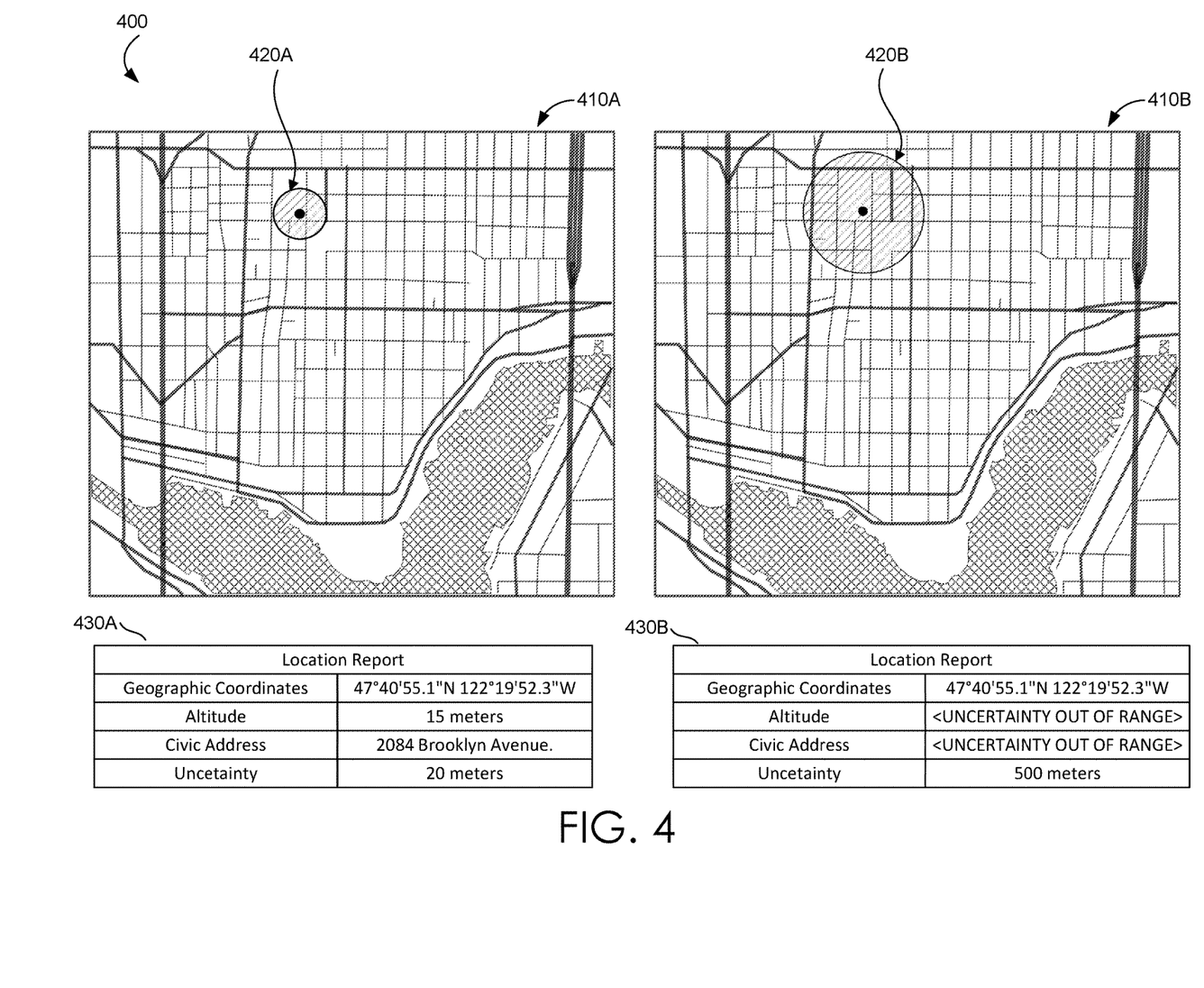
FIG. 4 depicts an example graphical user interface (GUI) for uncertainty based location reporting in E911 systems, in accordance with aspects herein.

FIG. 4 depicts an example graphical user interface (GUI) 400 for uncertainty based location reporting in E911 systems, in accordance with implementation of the present disclosure. The GUI 400 may include one or more graphical elements depicting a geographic area, such as maps 410A and 410B. Maps 410A and 410B may be generated as part of a Geographic Information System (GIS), aerial and/or satellite imaging, or any suitable method for depicting a geographic region. In some examples, the maps 410A and 410B may include information such as street names, addresses, building labels, and/or any other information.

The maps 410A and 410B may include an indication of a UE location associated with a UE device such as UE locations 420A and 420B. In some embodiments, UE locations, such as UE locations 420A and 420B, may be associated with a UE device that has initiated a call, such as a call from a caller seeking emergency services. In some embodiments, the UE locations may be depicted as a single point on a map that indicates the location of the associated UE device. In the same or additional embodiments, the UE locations may be depicted in the map as an area that may indicate a possible search area. For example, based on the uncertainty value of the DBH location received in association with a UE, map 410A may depict the UE location 420A as a region generated to reflect the uncertainty value. As another example, map 410B depicts a UE location 420B in the same location as UE location 410A with respect to their relative maps 410A and 410B, but depicted as a larger geographic region due to a higher uncertainty value of the DBH location measurement. The GUI 400 may include any of a number of graphical elements that indicate the location of a UE device and associated information.

As discussed above, a location report may be generated. For example, location reports 430A and 430B may be generated. In some embodiments, location reports may be generated in association to other graphical elements such as maps 410A and 410B. In some embodiments, the location report is generated to include location information for a UE device. The location report may include location information for the UE using a CID or an E-CID. In some examples, the location report may include information such as geographic coordinates, altitude, uncertainty values, and/or civic address. In certain embodiments, the contents of a location report may be determined based on satisfying certain criteria, such as the uncertainty value of a DBH location associated with a UE device. For example, location report 430A includes values for altitude and civic address since the uncertainty value is 20 meters. An uncertainty value may be compared to a threshold value to determine whether to include certain content items in a location report. Some content items may be omitted from a location report or an indication that the particular item does not satisfy a threshold may be provided. As another example, location report 430B does not include values for altitude and civic address since the uncertainty value of 500 meters may not satisfy a set threshold value, and instead an indication—that the uncertainty is out of range—is provided. In such an example where the uncertainty value is sufficiently large, providing the altitude and/or civic address may be of little benefit to a first responder, or could even act as a distraction or otherwise complicate the emergency response operations.

Figure 5:
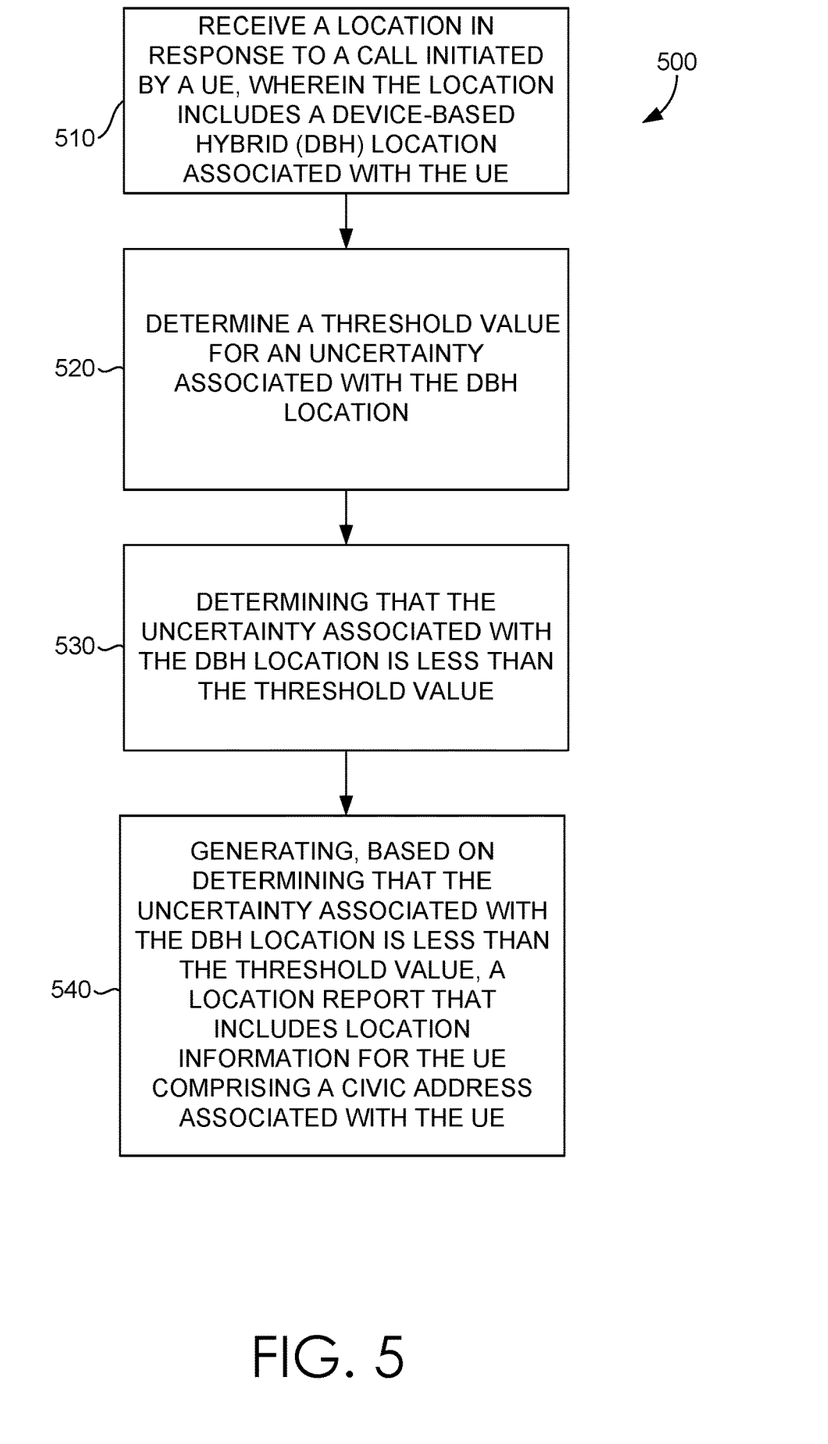
FIG. 5 depicts a flow chart of a method for uncertainty based location reporting in E911 systems, in accordance with aspects of the present disclosure.

FIG. 5 is a flow chart illustrating an example method 500 for uncertainty-based location reporting in E911 systems. It should be understood that while FIG. 5 depicts just one particular arrangement and/or order of steps, other arrangements and/or orders of steps are possible and contemplated by the disclosed herein. For instance, one or more of the steps depicted in FIG. 5, may be performed in a different order or otherwise omitted.

At step 510 of the method 500, a location may be received in response to a call initiated by a UE, such as UE(s) 130 of FIG. 1. For example, when a UE user places an emergency call, the UE may send an emergency attach request to the MME in the case of a 4G implementation and to the AMF in the case of a 5G implementation, which is forwarded to the GMLC in the case of a 4G implementation and the MPC in the case of a 5G implementation. The GMLC in the case of a 4G implementation and the MPC in the case of a 5G implementation may send a location request to the MME in the case of the 4G implementation and the AMF in the case of the 5G implementation, which is forwarded to the E-SMLC in the case of the 4G implementation and the LMF in the case of the 5G implementation. In response to the location request, the E-SMLC in the case of the 4G implementation and the LMF in the case of the 5G implementation may communicate with the UE via the MME in the case of the 4G implementation and the AMF in the case of the 5G implementation to obtain location information for the UE. In response, the UE may successfully provide its location information in the form of a DBH location to the E-SMLC in the case of the 4G implementation and the LMF in the case of the 5G implementation via the MME in the case of the 4G implementation and the AMF in the case of the 5G implementation. The DBH location information for the UE may be derived from a mix of location methods including crowd-sourced WiFi, Assisted Global Navigation Satellite System (A-GNSS), and UE-based sensors. In addition, the DBH location information for the UE may include an associated uncertainty estimate reflective of the quality of the estimated location of the UE. The information may include a Device-Based Hybrid (DBH) location that is associated with a particular UE device. For example, the DBH location may be associated with the UE device that initiated the call. In some embodiments, the DBH location may include uncertainty value that indicate a level of certainty in the location information. For example, the DBH location may include a horizontal uncertainty value indicative of uncertainty in the horizontal footprint and/or a vertical or altitude uncertainty indicative of uncertainty in an altitude measurement of the DBH location.

At step 520 of method 500, a threshold value is determined. In some embodiments, the threshold value indicated an uncertainty associated with the DBH location received in step 510. For example, in order to provide the PSAP with the most accurate location information for a distressed 911 caller, the E-SMLC in the case of the 4G implementation and the LMF in the case of the 5G implementation may determine a horizontal threshold uncertainty value for the DBH location for the UE and decide whether to generate certain information in a location report sent to a PSAP based on the determined uncertainty value. In embodiments, the threshold uncertainty value may be set to approximately 20 meters. In other embodiments, the threshold uncertainty value may be set to approximately 100 meters. In still further embodiments, the threshold uncertainty value may bet set to approximately 1 kilometer or any other desired value. For example, it may be determined that the threshold indicates an uncertainty of 1 kilometer. In some embodiments, the threshold may be a predetermined value. In some embodiments, the threshold may be determined based on location information, device information, service profile, and/or any other information suitable for determining a threshold value.

In certain aspects, the threshold may be updated periodically or in response to the needs of a service provider.

At step 530 of the method 500, it is determined that the uncertainty associated with the DBH location is less than the threshold value. For example, it may be determined that a DBH uncertainty value of 100 meters is greater than a determined threshold value of 50 meters, thus the threshold value is not satisfied. While step 530 describes determining that the uncertainty associated with the DBH location is less than the threshold value, it is not intended to be limiting. For example, it may be determined that the uncertainty associated with the DBH location is greater than, equal-to, and/or within a range in relation to one or more threshold values.

At step 540 of method 500, a location report is generated. In some embodiments, the location report is generated to include location information for the UE device. The location report may include location information for the UE such as a civic address if the uncertainty for the DBH location satisfies the threshold value. For example, when a DBH location estimate for the UE is returned having a uncertainty value of approximately 10 meters, the E-SMLC and/or the MME in the case of a 4G implementation or the LMF and/or the AMF in the case of a 5G implementation may send a location report to the GMLC in the case of the 4G implementation and the MPC in the case of a 5G implementation including the civic address associated with the UE. The GMLC in the case of a 4G implementation and the MPC in the case of the 5G implementation may then then send this location report to PSAP. In other embodiments, when the E-SMLC in the case of a 4G implementation or the LMF in the case of the 5G implementation returns a DBH location estimate for the UE having a uncertainty value at or above approximately 5 kilometers, the E-SMLC and/or MME in the case of a 4G implementation and the LMF and/or AMF in the case of a 5G implementation may send a location report to the GMLC in the case of a 4G implementation and the MPC in the case of a 5G implementation omitting the civic addressassociated with the UE. The GMLC in the case of a 4G implementation and the MPC in the case of a 5G implementation may then send the location report to PSAP For example, the location report may be generated to include information associated with UE(s) 130 of FIG. 1. In certain aspects the location information for the UE comprises a civic address associated the UE. For example, the location report 430A may be generated to include a civic address of "2084 Brooklyn Avenue" for a UE device associated with UE location 420A, as depicted in FIG. 4. In some embodiments, the contents of the location report may be based on determining that the uncertainty associated with the DBH location is less that the threshold value. For example, the civic address associated with the UE may be included in the location report if the DBH uncertainty is less than the threshold value.

Figure 6:
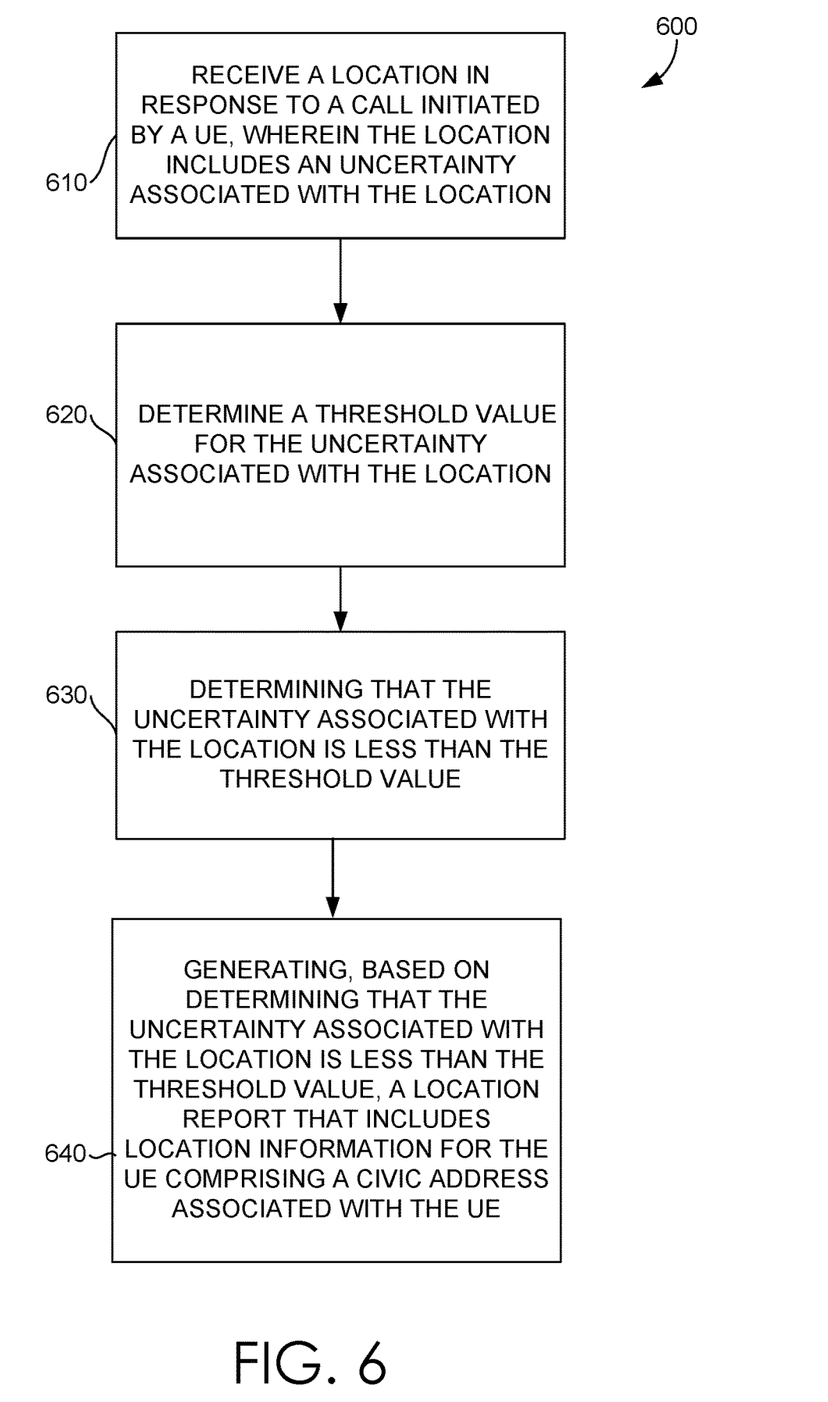
FIG. 6 depicts a flow chart of a method for uncertainty based location reporting in E911 systems, in accordance with aspects of the present disclosure.

FIG. 6 is a flow chart illustrating an example method 600 for uncertainty-based location reporting in E911 systems. In step 610 of method 600, a location may be received in response to a call initiated by a UE, such as UE(s) 130 of FIG. 1. For example, when a UE user places an emergency call. In response to the call, the UE may provide its location information in the form of a DBH location that may be derived from a mix of location methods including crowd-sourced WiFi, Assisted Global Navigation Satellite System (A-GNSS), and UE-based sensors. In addition, the location information for the UE may include an associated uncertainty estimate reflective of the quality of the estimated location of the UE. In some embodiments, the location provided by the UE may include a civic address associated with the UE or one or more users associated with the UE. In some other embodiments, the inclusion of a civic address may be placed in an active or inactive state. For example, if the civic address associated with a UE is in an inactive state, the civic address will not be provided as part of a locations report sent to a PSAP.

Step 620 of the method 600, a threshold value is determined. In some embodiments, the threshold value indicates an uncertainty associated with the location received in step 510. For example, in order to provide the PSAP with the most accurate location information for a distressed 911 caller, the E-SMLC in the case of the 4G implementation and the LMF in the case of the 5G implementation may determine a horizontal threshold uncertainty value for the location for the UE and decide whether to generate or omit certain information in a location report sent to a PSAP based on the determined uncertainty value. In still further embodiments, the threshold uncertainty value may bet set to approximately 1 kilometer or any other desired value. For example, it may be determined that the threshold indicates an uncertainty of 1 kilometer. In some embodiments, the threshold may be a predetermined value. In some embodiments, the threshold may be determined based on location information, device information, service profile, and/or any other information suitable for determining a threshold value. In certain aspects, the threshold may be updated periodically or in response to the needs of a service provider.

At step 630 of the method 600, it is determined that the uncertainty associated with the location is less than the threshold value. For example, it may be determined that a uncertainty value of 100 meters is greater than a determined threshold value of 50 meters, thus the threshold value is not satisfied. While step 630 describes determining that the uncertainty associated with the location is less than the threshold value, it is not intended to be limiting. For example, it may be determined that the uncertainty associated with the location is greater than, equal-to, and/or within a range in relation to one or more threshold values.

At step 640 of method 600, a location report is generated. In some embodiments, the location report is generated to include location information for the UE device. The location report may include location information for the UE such as a civic address if the uncertainty for the location satisfies the threshold value. For example, when a location estimate for the UE is returned having a uncertainty value of approximately 10 meters, a location report may be sent to the GMLC in the case of the 4G implementation and to the MPC in the case of a 5G implementation, where the location report includes the civic address associated with the UE. The location report may then be sent to a PSAP. In other embodiments, when the location estimate for the UE having a uncertainty value at or above approximately 5 kilometers, a location report may be generated omitting the civic addressassociated with the UE. For example, the location report may be generated to include information associated with UE(s) 130 of FIG. 1. In certain aspects the location information for the UE comprises a civic address associated the UE. As an example, the location report 430A may be generated to include a civic address of "2084 Brooklyn Avenue" for a UE device associated with UE location 420A, as depicted in FIG. 4.

Figure 7:
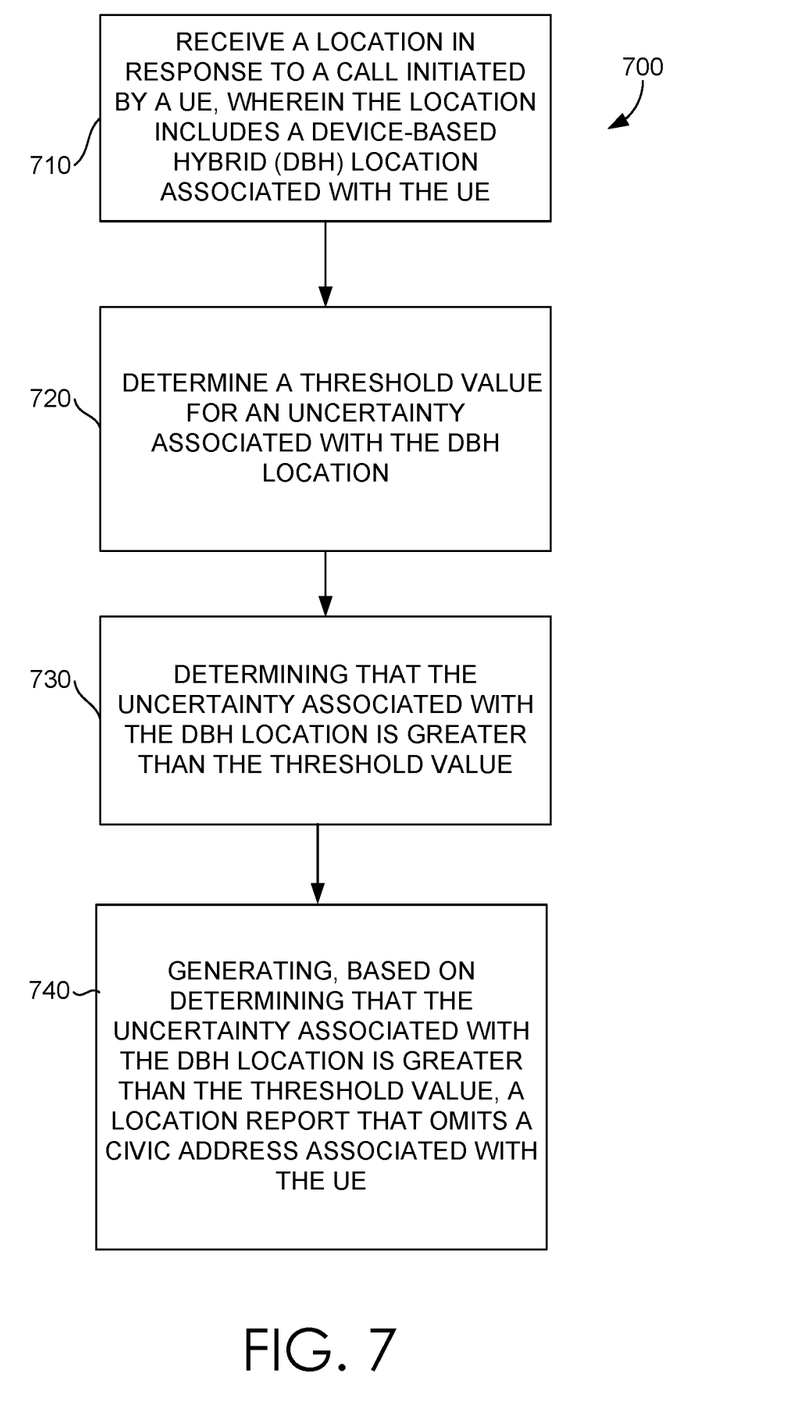
FIG. 7 depicts a flow chart of a method for uncertainty based location reporting in E911 systems, in accordance with aspects of the present disclosure.

FIG. 7 is a flow chart illustrating an example method 700 for uncertainty-based location reporting in E911 systems. In step 710 of method 700, a location may be received in response to a call initiated by a UE, such as UE(s) 130 of FIG. 1. For example, when a UE user places an emergency call. In response to the call, the UE may provide its location information in the form of a DBH location that may be derived from a mix of location methods including crowd-sourced WiFi, Assisted Global Navigation Satellite System (A-GNSS), and UE-based sensors. In addition, the DBH location information for the UE may include an associated uncertainty estimate reflective of the quality of the estimated location of the UE. In some embodiments, the location provided by the UE may include a civic address associated with the UE or one or more users associated with the UE. In some other embodiments, the inclusion of a civic address may be placed in an active or inactive state. For example, if the civic address associated with a UE is in an inactive state, the civic address will not be provided as part of a locations report sent to a PSAP.

Step 720 of the method 700, a threshold value is determined. In some embodiments, the threshold value indicated an uncertainty associated with the DBH location received in step 710. For example, in order to provide the PSAP with the most accurate location information for a distressed 911 caller, the E-SMLC in the case of the 4G implementation and the LMF in the case of the 5G implementation may determine a horizontal threshold uncertainty value for the DBH location for the UE and decide whether to generate or omit certain information in a location report sent to a PSAP based on the determined uncertainty value. In still further embodiments, the threshold uncertainty value may bet set to approximately 1 kilometer or any other desired value. For example, it may be determined that the threshold indicates an uncertainty of 1 kilometer. In some embodiments, the threshold may be a predetermined value. In some embodiments, the threshold may be determined based on location information, device information, service profile, and/or any other information suitable for determining a threshold value. In certain aspects, the threshold may be updated periodically or in response to the needs of a service provider.

At step 730 of the method 700, it is determined that the uncertainty associated with the DBH location is greater than the threshold value. For example, it may be determined that a DBH uncertainty value of 100 meters is greater than a determined threshold value of 50 meters, thus the threshold value is not satisfied. While step 730 describes determining that the uncertainty associated with the DBH location is greater than the threshold value, it is not intended to be limiting. For example, it may be determined that the uncertainty associated with the DBH location is less than, equal-to, and/or within a range in relation to one or more threshold values.

At step 740 of method 700, a location report is generated. In some embodiments, the location report is generated to include location information for the UE device. The location report may omit certain location information for the UE such as a civic address if the uncertainty for the DBH location does not satisfy or exceeds the threshold value. For example, when the DBH location estimate for the UE having a uncertainty value at or above approximately 1 kilometers and a threshold of 100 meters, a location report may be generated omitting the civic address associated with the UE. For example, the location report may be generated to include information associated with UE(s) 130 of FIG. 1 while omitting or otherwise removing the civic address. In certain aspects the location information for the UE omits a civic address associated the UE. As an example, the location report 430B may be generated to omit the civic address of "2084 Brooklyn Avenue" for a UE device associated with UE location 420B, as depicted in FIG. 4.

Figure 8:
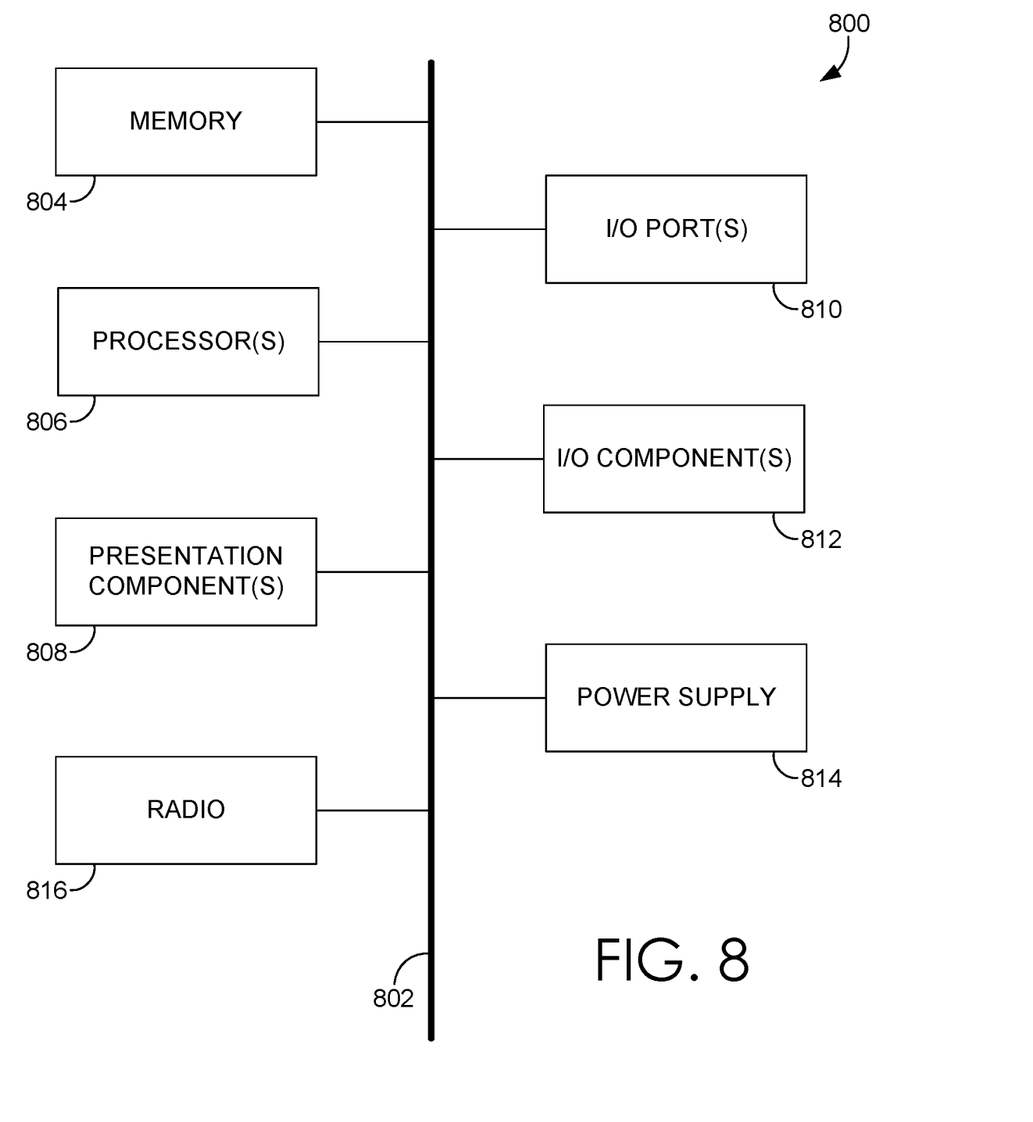
FIG. 8 depicts a diagram of an exemplary computing environment suitable for use in implementations of the present disclosure.

Referring now to FIG. 8, a diagram is depicted of an exemplary computing environment suitable for use in implementations of the present disclosure. In particular, the exemplary computer environment is shown and designated generally as computing device 800. Computing device 800 is but one example of a suitable computing environment and is not intended to suggest any limitation as to the scope of use or functionality of the invention. Neither should computing device 800 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 8, computing device 800 includes bus 802 that directly or indirectly couples the following devices: memory 804, one or more processors 806, one or more presentation components 808, input/output (I/O) ports 810, I/O components 812, power supply 814 and radio(s) 816. Bus 802 represents what may be one or more busses (such as an address bus, data bus, or combination thereof). Although the devices of FIG. 8 are shown with lines for the sake of clarity, in reality, delineating various components is not so clear, and metaphorically, the lines would more accurately be grey and fuzzy. For example, one may consider a presentation component, such as a display device to be one of I/O components 812. Also, processors, such as one or more processors 806, have memory. The present disclosure hereof recognizes that such is the nature of the art, and reiterates that FIG. 8 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 8 and refer to "computer" or "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data.

Computer storage media includes RAM, ROM, EEPROM, flash memory or other memory technology, CD-ROM, DVD or other optical disk storage, magnetic cassettes, magnetic tape, magnetic disk storage, or other magnetic storage devices. Computer storage media does not comprise a propagated data signal.

Communication media typically embodies computer-readable instructions, data structures, program modules, or other data in a modulated data signal, such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media such as acoustic, RF, infrared, and other wireless media. Combinations of any of the above should also be included within the scope of computer-readable media.

Memory 804 includes computer-storage media in the form of volatile and/or nonvolatile memory. Memory 804 may be removable, non-removable, or a combination thereof. Exemplary memory includes solid-state memory, hard drives, optical-disc drives, etc. Computing device 800 includes one or more processors 806 that read data from various entities, such as bus 802, memory 804, or I/O components 812. One or more presentation components 808 presents data indications to a person or other device. Exemplary one or more presentation components 808 include a display device, speaker, printing component, vibrating component, etc. I/O ports 810 allow computing device 800 to be logically coupled to other devices, including I/O components 812, some of which may be built in computing device 800. Illustrative I/O components 812 include a microphone, joystick, game pad, satellite dish, scanner, printer, wireless device, etc.

Radio 816 represents a radio that facilitates communication with a wireless telecommunications network. Illustrative wireless telecommunications technologies include CDMA, GPRS, TDMA, GSM, and the like. Radio 816 might additionally or alternatively facilitate other types of wireless communications including Wi-Fi, WiMAX, LTE, or other VoIP communications. As can be appreciated, in various embodiments, radio 816 can be configured to support multiple technologies and/or multiple radios can be utilized to support multiple technologies. A wireless telecommunications network might include an array of devices, which are not shown so as to not obscure more relevant aspects of the invention. Components, such as a base station, a communications tower, or even access points (as well as other components), can provide wireless connectivity in some embodiments.

Many different arrangements of the various components depicted, as well as components not shown, are possible without departing from the scope of the claims below. Embodiments of this technology have been described with the intent to be illustrative rather than be restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. An Enhanced 911 (E911) method, the method comprising:
   receiving a location in response to a call initiated by a UE, wherein the location includes a device-based hybrid (DBH) location associated with the UE;
   determining a threshold value for an uncertainty associated with the DBH location;
   determining that the uncertainty associated with the DBH location is less than the threshold value; and
   generating, based on determining that the uncertainty associated with the DBH location is less than the threshold value, a location report that includes location information for the UE comprising a civic address associated with the UE.

2. The method of claim 1, further comprising sending the location report to a Public Safety Answering Point (PSAP).

3. The method of claim 1, wherein generating the location report further comprises determining that a civic address is in an active state.

4. The method of claim 1, wherein the threshold value is approximately 20 meters.

5. The method of claim 1, wherein the threshold value is approximately 500 meters.

6. The method of claim 1, wherein the location report includes an indication of the uncertainty associated with the DBH location.

7. The method of claim 1, wherein the location includes the civic address associated with the UE.

8. The method of claim 7, further comprising determining that the uncertainty associated with the DBH location is greater than the threshold value; and
   generating, based on determining that the uncertainty associated with the DBH location is greater than the threshold value, a location report that omits the civic address associated with the UE.

9. One or more computer-readable media having computer-executable instructions embodied thereon that, when executed, perform a method for sending an Enhanced 911 (E911) location report, the method comprising:
   receiving a location in response to a call initiated by a UE, wherein the location includes an uncertainty associated with the location and wherein the location includes a device-based hybrid (DBH) location associated with the UE;
   determining a threshold value for the uncertainty associated with the location;
   determining if the uncertainty associated with the location is less than the threshold value; and
   generating, based on determining that the uncertainty associated with the location is less than the threshold value, a location report that includes location information for the UE comprising a civic address associated with the UE.

10. The media of claim 9, further comprising, sending the location report to a Public Safety Answering Point (PSAP).

11. The media of claim 9, wherein generating the location report further comprises determining that a civic address is in an active state.

12. The media of claim 9, wherein the location report includes an indication of the uncertainty associated with the location.

13. The media of claim 9, wherein the location includes the civic address associated with the UE.

14. The media of claim 13, further comprising determining that the uncertainty associated with the location is greater than the threshold value; and
   generating, based on determining that the uncertainty associated with the location is greater than the threshold value, a location report that omits the civic address associated with the UE.

15. A system for generating an enhanced 911 (E911) location report, the system comprising one or more processors configured to execute operations comprising:

receiving a location in response to a call initiated by a UE, wherein the location includes a device-based hybrid (DBH) location associated with the UE;

determining a threshold value for an uncertainty associated with the DBH location;

determining if the uncertainty associated with the DBH location is greater than the threshold value; and generating, based on determining that the uncertainty associated with the DBH location is greater than the threshold value, a location report that omits a civic address associated with the UE.

16. The system of claim 15, further comprising, sending the location report to a Public Safety Answering Point (PSAP).

17. The system of claim 15, wherein the location report includes an indication of the uncertainty associated with the DBH location.

18. The system of claim 15, wherein the location includes the civic address associated with the UE.

19. The system of claim 15, further comprising determining that the uncertainty associated with the DBH location is less than the threshold value; and generating, based on determining that the uncertainty associated with the DBH location is less than the threshold value, a location report that includes the civic address associated with the UE.

* * * * *